United States Patent
Jain et al.

(10) Patent No.: US 7,515,530 B2
(45) Date of Patent: *Apr. 7, 2009

(54) DETECTING LOOPS BETWEEN NETWORK DEVICES BY MONITORING MAC MOVES

(75) Inventors: Vipin Jain, San Jose, CA (US); Shriram Srinivasan, Santa Clara, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 223 days.

This patent is subject to a terminal disclaimer.

(21) Appl. No.: 11/544,405

(22) Filed: Oct. 6, 2006

(65) Prior Publication Data
US 2007/0118595 A1 May 24, 2007

Related U.S. Application Data

(63) Continuation-in-part of application No. 10/809,028, filed on Mar. 25, 2004.

(60) Provisional application No. 60/748,133, filed on Dec. 7, 2005.

(51) Int. Cl.
*G01R 31/08* (2006.01)

(52) U.S. Cl. .................. 370/222; 370/216; 370/218; 370/219; 370/220

(58) Field of Classification Search .............. 709/203; 370/270
See application file for complete search history.

(56) References Cited

U.S. PATENT DOCUMENTS

| | | | | |
|---|---|---|---|---|
| 6,023,563 A | * | 2/2000 | Shani | 709/249 |
| 6,104,696 A | * | 8/2000 | Kadambi et al. | 370/218 |
| 6,298,456 B1 | * | 10/2001 | O'Neil et al. | 714/48 |
| 6,603,740 B1 | * | 8/2003 | Du | 370/248 |
| 6,857,027 B1 | | 2/2005 | Linderborg et al. | |
| 2004/0081248 A1 | | 4/2004 | Parolari et al. | |
| 2004/0218539 A1 | | 11/2004 | Anqud et al. | |

* cited by examiner

*Primary Examiner*—Curtis Kuntz
*Assistant Examiner*—Phung-Hoang J Nguyen

(57) ABSTRACT

A technique for detecting a loop between network devices such as customer and carrier edge devices involves counting the number of media access control (MAC) address moves that occur at a device and comparing the number of MAC address moves to a pre-established MAC move threshold. The technique includes artificially accelerating the MAC move count related to a MAC address when the MAC address is moving between a set of ports at which the MAC address was previously found. The MAC move count is artificially accelerated because movement of a MAC address between a set of ports at which the MAC address was previously found is a strong indication of loop. The MAC move count is artificially accelerated by weighting the MAC move count once it has been determined that a MAC is moving between a set of ports at which the MAC address was previously found.

20 Claims, 15 Drawing Sheets

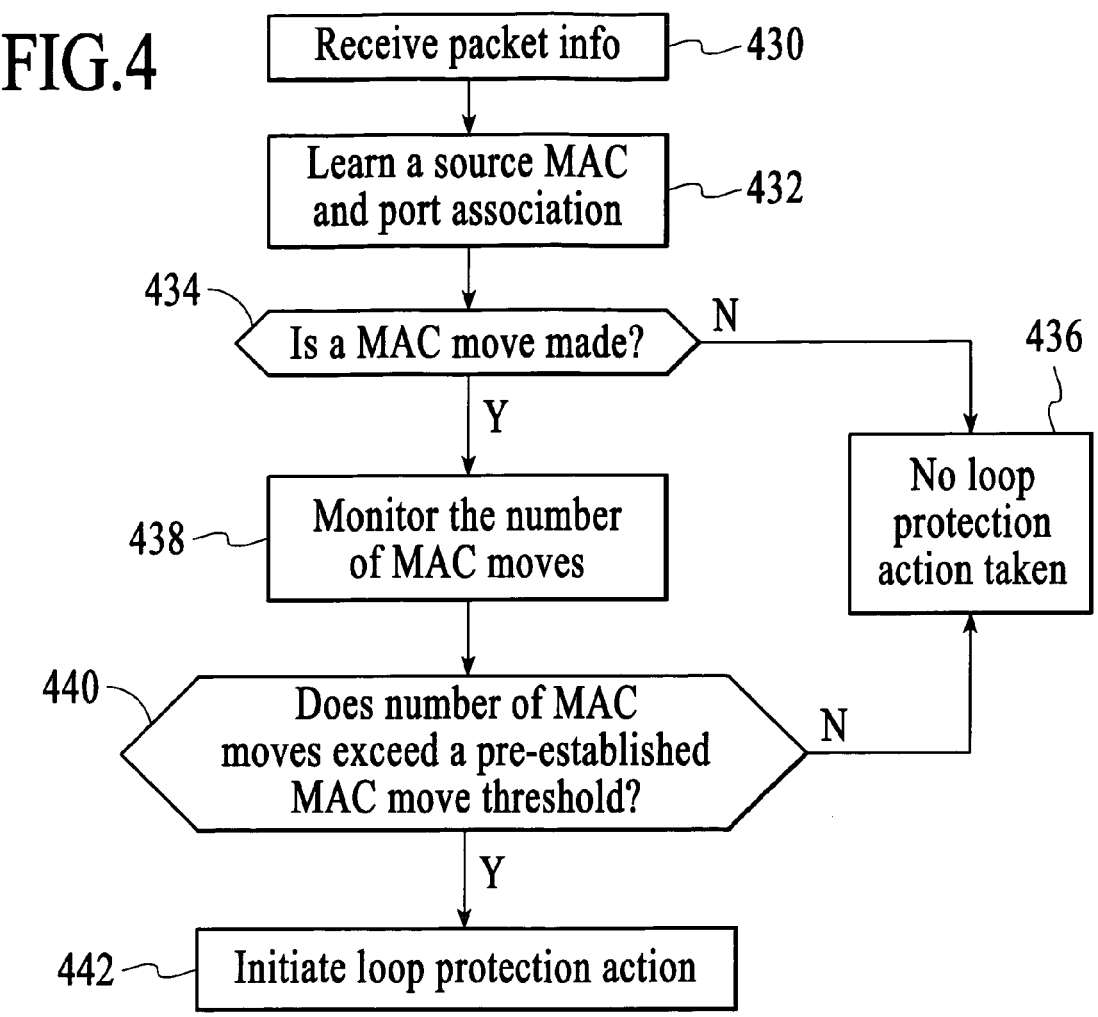

| Field | Description |
|---|---|
| MAC Address | Source MAC Address |
| Broadcast Domain ID | Broadcast domain on which MAC moves are monitored |
| MAC Move Count | Number of times the MAC address has moved within a pre-established interval |
| Port Set | Identity of the ports at which the source MAC address was previously found within a pre-established time interval |
| Size of Port Set | The maximum number of ports in the port set |

FIG.12

DETECTING LOOPS BETWEEN NETWORK DEVICES BY MONITORING MAC MOVES

CROSS-REFERENCE TO RELATED APPLICATION

This application is a continuation-in-part of previously filed and co-pending patent application Ser. No. 10/809,028, filed 25 Mar. 2004. Additionally, this application is entitled to the benefit of provisional Patent Application Ser. No. 60/748,133, filed 7 Dec. 2005.

FIELD OF THE INVENTION

The invention relates generally to network management, and more particularly, to detecting and managing loops between network devices.

BACKGROUND OF THE INVENTION

Mission critical networks play an increasingly crucial role in the global business environment and are becoming inextricably linked to and dependent on carrier networks for support. In many cases, suppliers of carrier network services do not manage the customer premise equipment (CPE) of their customers' networks and therefore have no control over configuration errors at the customer network that can result in various network failures, including traffic loops. Such configuration errors at the customer network can force traffic into a never ending circular path that spans edge devices of the customer and carrier networks, significantly impacting the overall stability of the carrier network. Because the carrier does not control the CPE, the carrier is not able to resolve loops at the source. Resolving loops that originate from a customer network, typically requires manual troubleshooting by the carrier. Manual troubleshooting is expensive and time consuming.

In view of the relationship between carrier and customer networks, what is needed is a technique for detecting and managing loops between network devices, particularly edge devices of customer and carrier networks.

SUMMARY OF THE INVENTION

A technique for detecting a loop between network devices such as customer and carrier edge devices involves counting the number of media access control (MAC) address moves (e.g., source MAC address moves) that occur at a device and comparing the number of MAC address moves to a pre-established MAC move threshold. The technique includes artificially accelerating the MAC move count related to a MAC address when the MAC address is moving between a set of ports at which the MAC address was previously found. The MAC move count is artificially accelerated because movement of a MAC address between a set of ports at which the MAC address was previously found is a strong indication of loop. The MAC move count is artificially accelerated by weighting the MAC move count once it has been determined that a MAC address is moving between a set of ports at which the MAC address was previously found.

If a loop is detected as a result of counting the MAC moves, a loop protection action can be initiated. Typically, the loop protection action that is initiated in response to a detected loop involves blocking the flow of the looping packets at the corresponding device.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 4 is a process flow diagram of a method for managing loops between network devices in accordance with an embodiment of the invention.

FIG. 5 illustrates an example implementation of the method that is depicted in FIG. 4 relative to carrier edge device A in FIG. 3.

FIG. 12 depicts an exemplary MAC move table that includes fields for tracking MAC moves.

Throughout the description, similar reference numbers may be used to identify similar elements.

DETAILED DESCRIPTION

Figure 1:
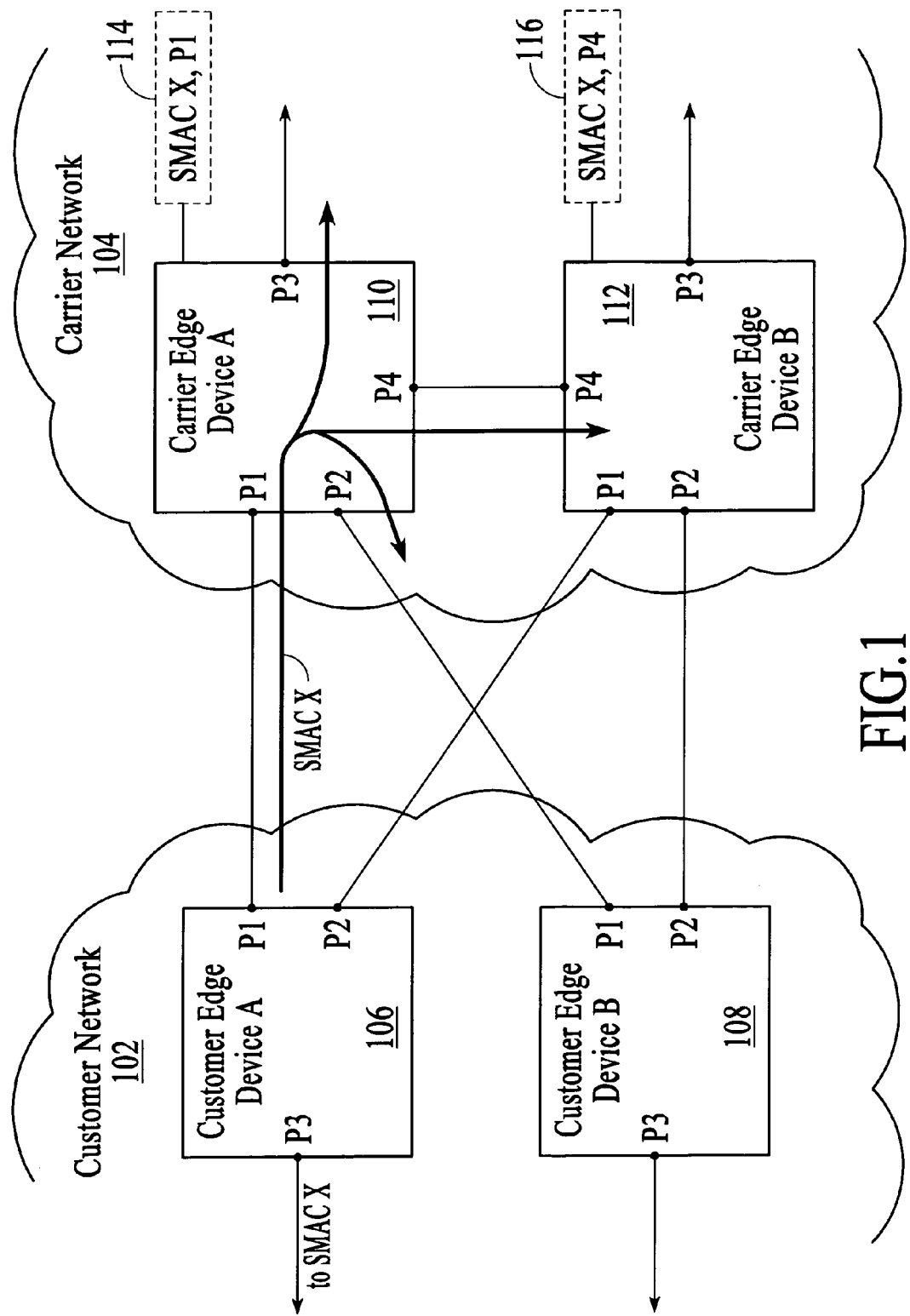
FIG. 1 depicts a first network, for example a customer network, which is connected to a second network, for example a carrier network.

FIG. 1 depicts a first network 102, for example a customer network, which is connected to a second network 104, for example a carrier network. The customer network includes two customer edge devices (customer edge devices A and B 106 and 108) and the carrier network includes two carrier edge devices (carrier edge devices A and B 110 and 112). In the example of FIG. 1, the customer and carrier edge devices utilize Ethernet at layer 2 of the open system interconnect (OSI) model as defined by the International Standards Organization (ISO). As is well known in the field, Ethernet assigned media access control (MAC) addresses to network devices and "source" and "destination" MAC addresses are used to determine how to forward packets through a network.

The customer edge devices 106 and 108 and the carrier edge devices 110 and 112 depicted in FIG. 1 are connected to each other in a redundant configuration in which each customer edge device is connected to each carrier edge device. Given the redundant configuration, each link between the customer network and the carrier network has a secondary link that can be utilized if the primary link fails. Although the redundant configuration provides improved reliability in the event of a link failure, the redundant configuration enables traffic loops that span between edge devices of the carrier and customer networks.

In addition to the redundant configuration, FIG. 1 also illustrates an example of MAC address learning that takes place at the carrier edge devices 110 and 112. In the example of FIG. 1, learning is based on a packet that is transmitted from customer edge device A 106 on port P1 with a source MAC address of X (referred to herein as "source MAC" or "source MAC X"). As is well known in the field of packet-based networking, particularly in Ethernet networks, when the packet arrives at carrier edge device A, the carrier edge device associates the source MAC address of the packet with the port on which the packet arrived and stores the associated pair in a forwarding table. As illustrated by the dashed line box 114 in FIG. 1, the carrier edge device A associates source MAC X with port P1 through the learning process. The associated pair is then used to forward a subsequently received packet having a destination MAC address that matches the MAC address of the associated MAC address and port pair.

In addition to source MAC learning, if carrier edge device A 110 does not yet known how to reach the destination MAC address that is carried in the header of the packet (e.g., the next hop), then the carrier edge device will "flood" the packet out of all of its ports (except the port on which the packet was received) and wait to see on which port a complementary packet is received. Flooding is a well known technique in Ethernet-based networking and is not described in more detail herein. As a result of flooding, carrier edge device B 112 receives a copy of the packet with source MAC X at port P4. Through the learning process as described above, carrier edge device B associates source MAC X with its port P4 and stores the association in a forwarding table (see dashed line box 116).

Figure 2:
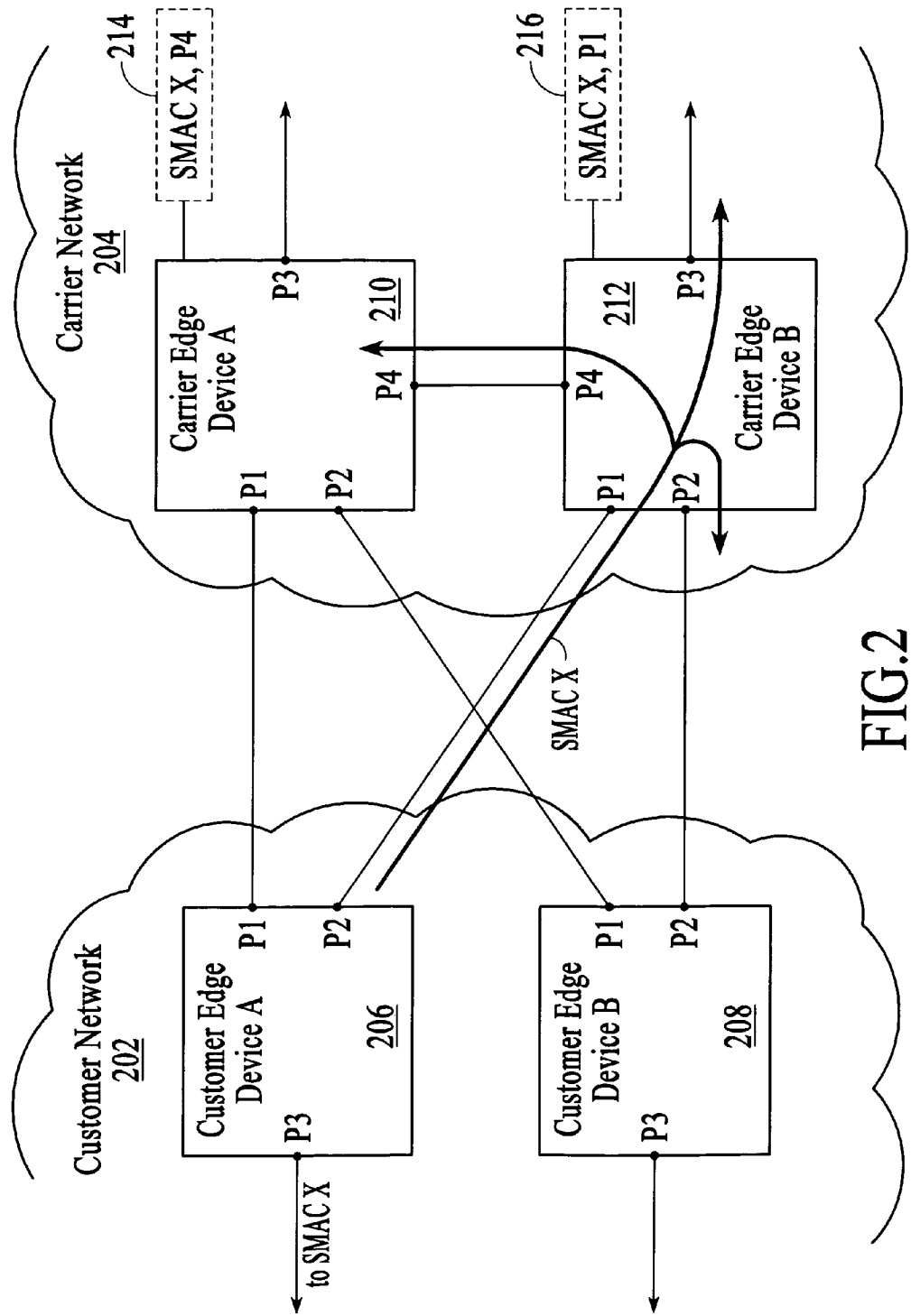
FIG. 2 illustrates the learning and flooding processes for the case of a customer packet that is transmitted from customer edge device A to carrier edge device B.

If the same packet were to emanate from port P2 of customer edge device A 106 instead of port P1 of customer edge device A, then the learning and flooding processes would be reversed for carrier edge devices A and B. FIG. 2 illustrates the learning and flooding processes for the case of a customer packet having source MAC X that is transmitted from customer edge device A 206 on port P2 to carrier edge device B 212. As illustrated in FIG. 2, carrier edge device B receives the packet and learns source MAC X on port P1 (see dashed line box 216). Assuming carrier edge device B does not already know the next hop for the destination MAC address of the received packet, carrier edge device B floods the packet to carrier edge device A 210 via port P4. In response to the flooding at carrier edge device B, carrier edge device A learns source MAC X on its port P4 (see dashed line box 214).

Given the scenarios of FIGS. 1 and 2, if customer edge device A forwards a packet to the carrier network from either port P1 or P2, then the carrier edge devices perform the necessary learning and the carrier network settles into a steady state (e.g., the forwarding tables stabilize and learning is limited to new flows). However, if the customer network experiences a configuration error that allows the same packet (or different packets with the same source MAC) to be forwarded from both port P1 and port P2 of customer edge device A, a loop or loops may be created between customer edge device A and carrier edge devices A and B.

Figure 3:
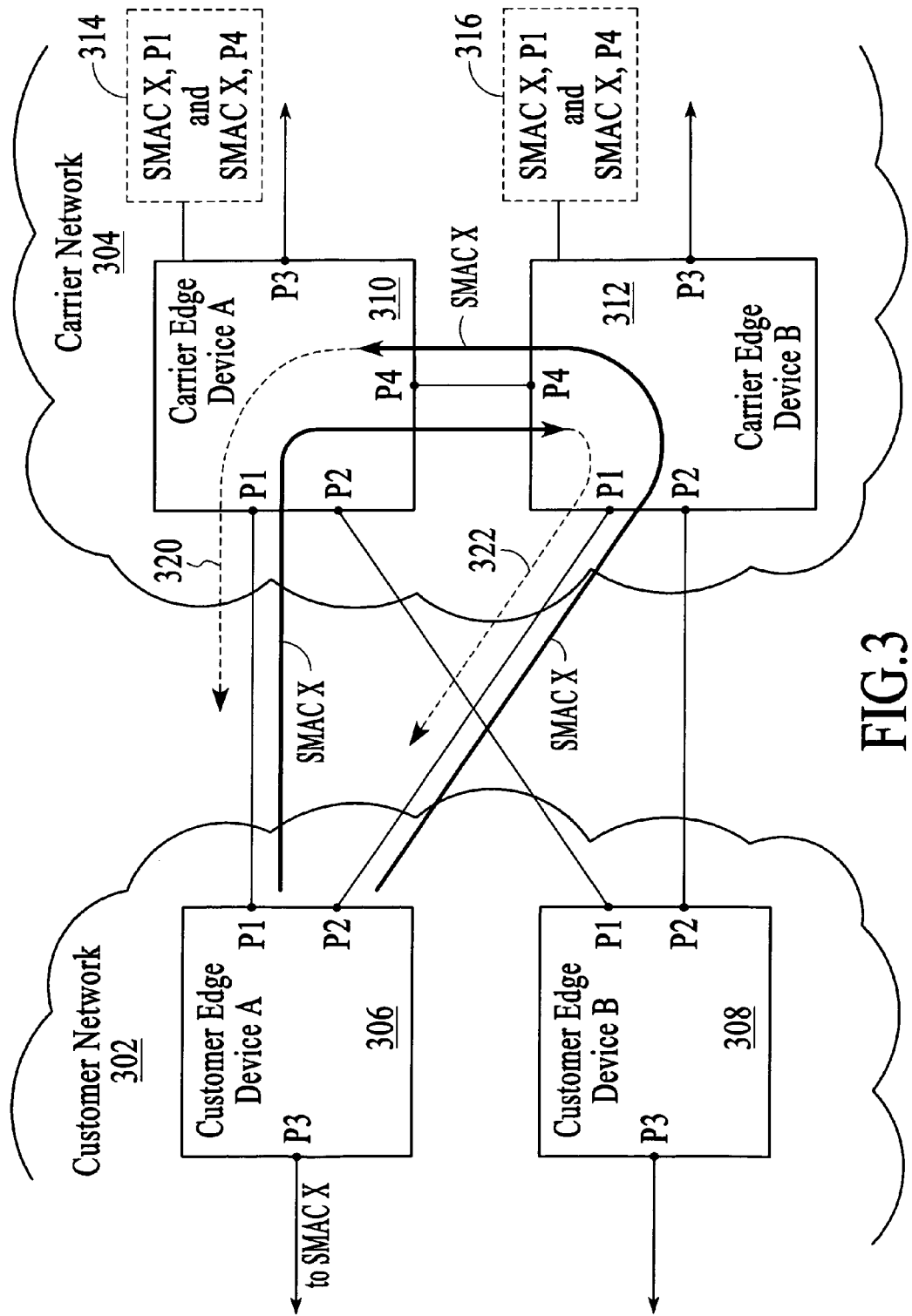
FIG. 3 illustrates the loop that is created between the customer network and the carrier network when packets having the same source MAC addresses are forwarded to the carrier network from two ports of customer edge device A.

FIG. 3 illustrates the loop that is created between the customer network 302 and the carrier network 304 when packets having the same source MAC are forwarded to the carrier network from two ports of customer edge device A 306. Referring to FIG. 3, customer edge device A forwards packets with source MAC X from both ports P1 and P2. Carrier edge device A 310 receives one of the packets with source MAC X at port P1 and learns source MAC X on port P1 as described above. Carrier edge device A also floods the received packet to carrier edge device B 312. Carrier edge device B receives one of the packets with source MAC X at its port P1 and learns source MAC X on P1. Carrier edge device B also floods the received packet to carrier edge device A. Carrier edge device A receives, at port P4, the flooded packet from carrier edge device B and responds by flooding the packet to port P1 (as indicated by dashed line 320). Likewise, carrier edge device B receives, at port 4, the flooded packet from carrier edge device A and responds by flooding the packet to port P1 (as indicated by dashed line 322). Thus, the flooding creates one loop that runs (clockwise) from customer edge device A, to carrier edge device A, to carrier edge device B, and back to customer edge device A and another loop that runs (counter clockwise) from customer edge device A, to carrier edge device B, to carrier edge device A, and back to customer edge device A. The looping traffic can have a severe negative impact on the performance of the carrier network.

As a result of the loops that are created between the customer and carrier edge devices, carrier edge devices A and B 310 and 312 learn source MAC X on two different ports. For example, when carrier edge device A receives a packet on port P1, it learns source MAC X on port P1 and when it receives a packet on port P4, it learns source MAC X on port P4 (see dashed line boxes 314 and 316). This causes the carrier edge device to go into an unsettled state in which the source MAC address and port association is constantly changing. Each change in the source MAC address and port association is referred to herein as a "MAC move" because the source MAC address moves from appearing at one port to appearing at another port. In sum, when a loop exists, the affected carrier edge device experiences a significant increase in the rate of MAC moves that occur.

In accordance with an embodiment of the invention, loops between network devices such as customer and carrier edge devices are managed by monitoring the MAC moves that occur at a device to detect the existence of a loop and then initiating a loop protection action if the MAC moves indicate that a loop exists. The number of MAC moves that indicates the existence of a loop is user programmable and pre-established in the device configuration. The number of MAC moves can be expressed as a MAC move threshold, which is defined in terms of, for example, a MAC move rate or a number of MAC moves. Typically, the loop protection action that is initiated in response to a detected loop involves blocking the flow of the looping packets at the corresponding device.

FIG. 4 is a process flow diagram of a method for managing loops between network devices in accordance with an embodiment of the invention. At block 430, packet information is received. At block 432, a source MAC address and port association is learned. At decision point 434, it is determined whether the learned source MAC address and port association triggers a MAC move. If the learned source MAC and port association does not trigger a MAC move, then no loop protection action is taken, block 436. However, if the learned source MAC address and association does trigger a MAC move, then the number of MAC moves is monitored, block 438. At decision block 440, it is determined if the number of MAC moves exceeds a pre-established MAC move threshold. If the pre-established MAC move threshold is not exceeded, then no loop protection action is taken, block 436. However, if the pre-established MAC move threshold is exceeded, then it is concluded that a loop exists and a loop protection action is initiated, block 442.

FIG. 5 illustrates an example implementation of the method that is depicted in FIG. 4 relative to carrier edge device A in FIG. 3. The example implementation shows a table of the MAC learning state of the carrier edge device and the cumulative number of MAC moves as a function of time. The table includes five MAC moves that occur from time $t_0$ to time $t_5$. MAC moves and the MAC move threshold can be defined and/or expressed in terms of the number of MAC moves or a MAC move rate depending on the implementation. In general, the MAC move rate is calculated as:

MAC move rate=number of MAC moves/elapsed time

In the example of FIG. 5, the MAC move rate is calculated as $5/(t_5-t_0)$. In an embodiment, the MAC move rate is programmed as a number of MAC moves per second and the MAC moves are monitored with a counter that is incremented for each MAC move.

Figure 6:
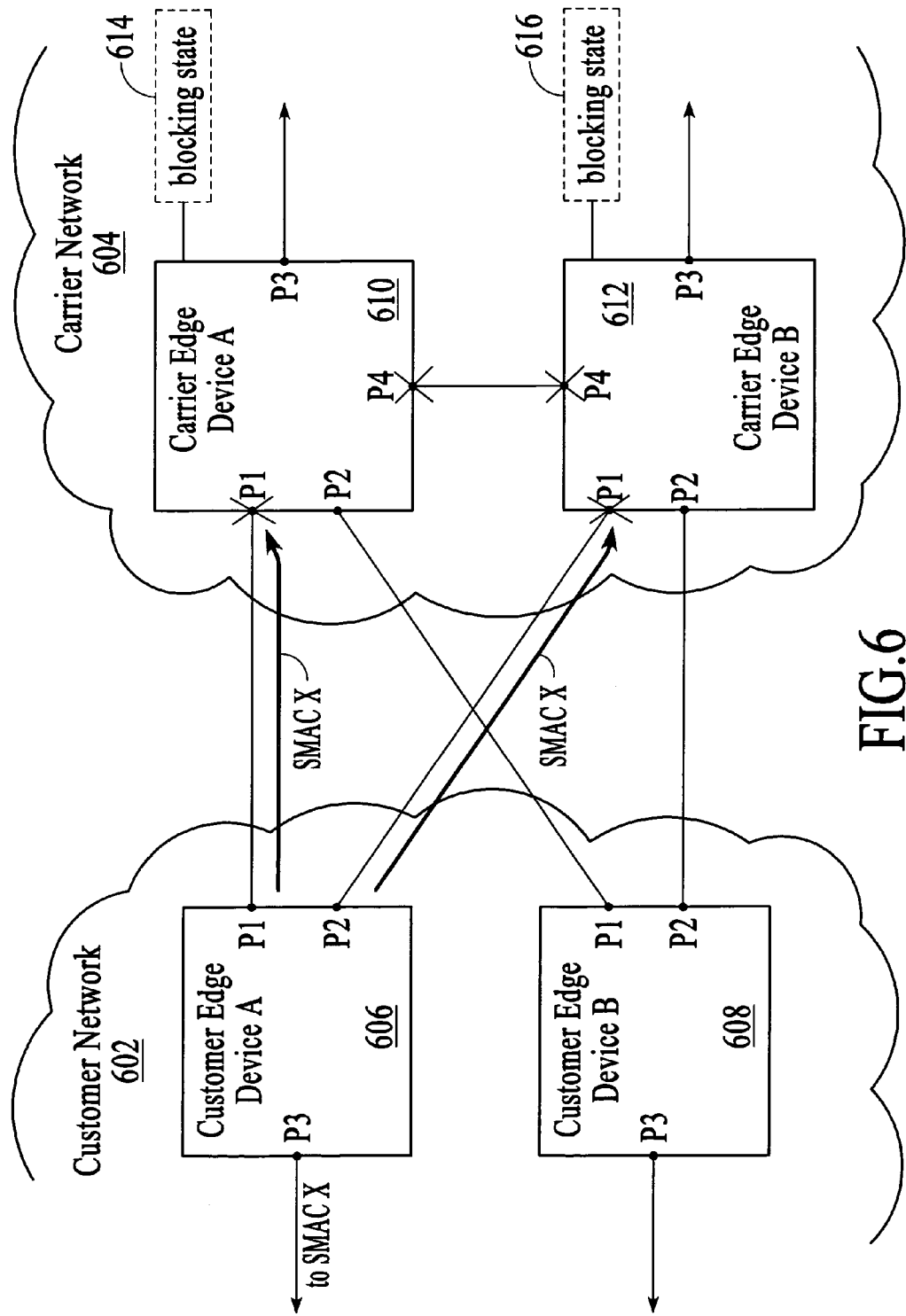
FIG. 6 illustrates ports in a blocking state and how blocking the source MAC flows at the carrier edge devices eliminates the existence of loops.

For example purposes, it is assumed that the MAC move rate in the example of FIG. 5 exceeds the pre-established MAC move threshold. As described above with reference to FIG. 4, once the MAC move rate is determined to exceed the pre-established MAC move threshold, a loop protection action is initiated. In an embodiment, a loop protection action involves blocking all of the packet flows related to the source MAC address that exceeds the MAC move threshold. In the example of FIG. 3, if the MAC move rate is exceeded at both carrier edge devices A and B 310 and 312, then the corresponding flows with source MAC X are blocked at the ports of both carrier edge devices. FIG. 6 illustrates the relevant ports in a blocking state (all of the ports could be put into a blocking state for the flow) and how blocking the source MAC flows at the relevant ports of the carrier edge devices eliminates the existence of loops.

In an embodiment, the blocking is configured to last for a pre-established time period after which the blocking is automatically released. Ideally, the configuration error at the customer edge device is corrected during the time that the blocking is in place. If the configuration error still exists when the ports are released, then the loops may start again, eventually causing the blocking to be initiated again. In another embodiment, the blocking is configured to last until it is manually released. Other techniques for releasing the blocking can be implemented.

In an embodiment, the blocking is specific to the flow that exceeds the MAC move threshold. That is, packets from flows that do not exceed the MAC move threshold are not blocked when the loop protection is initiated. For example, if source MAC X utilizes two different VLANs (e.g., VLAN 10 and VLAN 20) and only VLAN 10 packets are looping and causing the MAC move threshold to be exceeded, then only the packets with source MAC X and VLAN 10 will be blocked. This "flow-specific" blocking can be applied to any flow designation, category, class etc. Flows can be designated by any combination of, for example, source MAC, destination MAC, VLAN ID, MPLS label, tag etc. In contrast, other loop management systems such as the spanning tree protocol (STP), as defined by the IEEE 802.1D, block all traffic at a port when a port goes into a blocking state.

Figure 7:
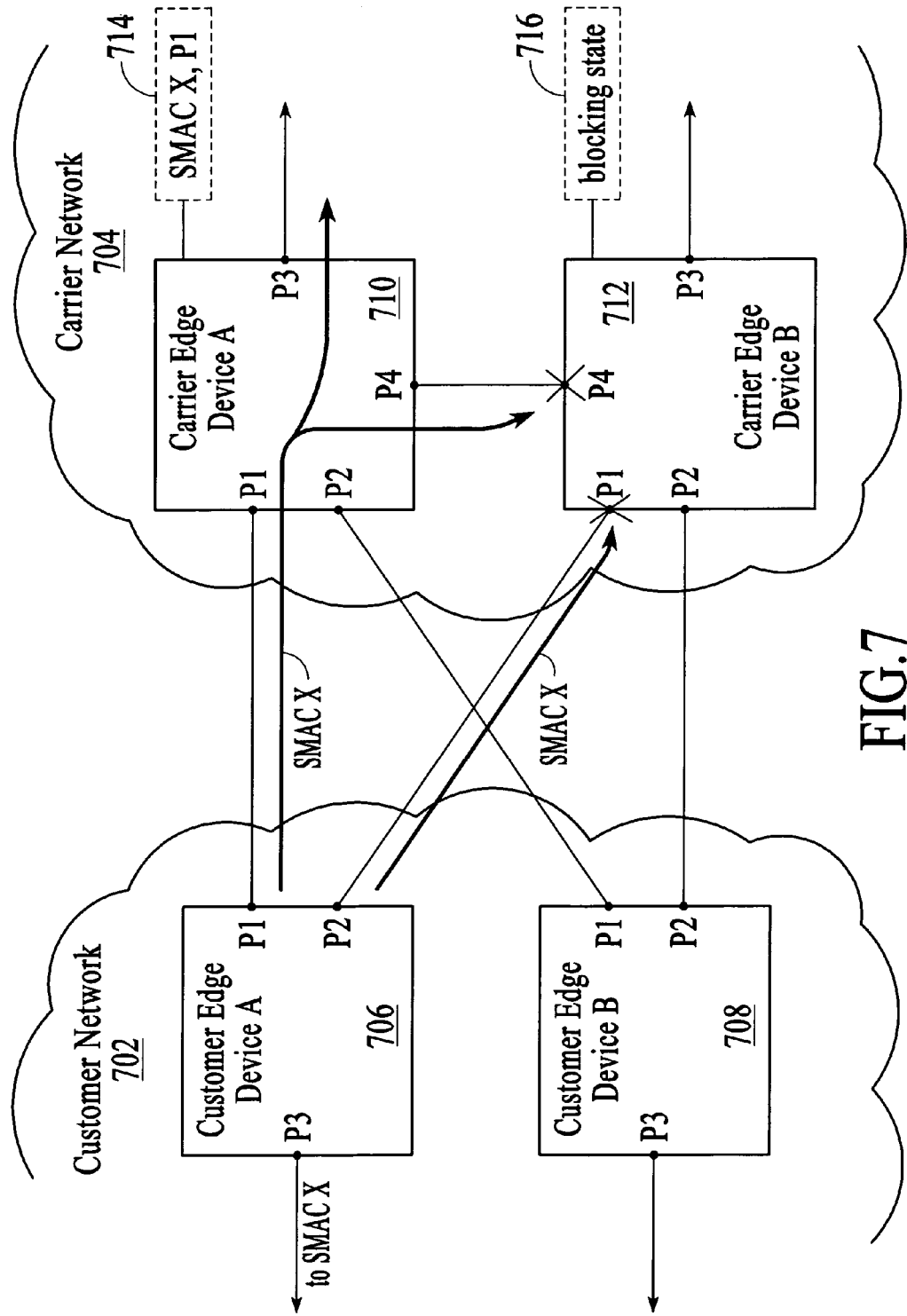
FIG. 7 illustrates the case in which carrier edge device B initiates blocking before carrier edge device A.

Although blocking the corresponding flows eliminates the loop problem, blocking the corresponding flows at both carrier edge devices as depicted in FIG. 6 prevents (at least temporarily) the blocked traffic from reaching its destination. In another embodiment, one of the carrier edge devices will exceed the MAC move threshold and initiate blocking before the MAC move threshold is exceeded at the other carrier edge device. FIG. 7 illustrates the case in which carrier edge device B 712 initiates blocking before carrier edge device A 710. In particular, carrier edge device B blocks the corresponding flows at ports P1 and P4 as indicated in FIG. 7. In this case, the loop condition is eliminated as a result of the blocking at carrier edge device B and packets with source MAC X are still able to pass into the carrier network from customer edge device A 706 through carrier edge device A. Additionally, because the loop condition is eliminated, carrier edge device A will probably not exceed the MAC move threshold and therefore will not initiate its own blocking. In an embodiment, it is not necessary to block port P4 on carrier edge device B to prevent a loop. Further, leaving port P4 unblocked allows the carrier edge devices to communicate with each other.

In an embodiment, the flows that are allowed to be blocked in response to loop detection are configurable. That is, each carrier edge device can be configured to allow the blocking of only certain flows. The designation of blockable flows may include any combination of, for example, ports, virtual circuits, VLANs, MPLS labels, tagged packets, untagged packets etc. In an embodiment, the designation of blockable flows includes a list of blockable ports and a list of VLANs that can be blocked on the blockable ports. The VLANs may be identified as, for example, a specific VLAN (e.g., VLAN 10), VLAN ranges (e.g., 10-20, 40-50, and 60), all VLANs, or all VLANs except designated VLANs.

The loop management system can also be configured to log a message that indicates the blocking action. The message can be sent to a syslog server. Messages indicating unblocking can also be generated and sent to the syslog server.

The MAC move threshold can be established in many different ways. According to one technique, a loop or loops are purposefully created between the customer and carrier edge devices and the number of MAC moves is monitored. For example, the MAC move rate is measured by counting the number of MAC moves per unit of time. The MAC move threshold is then established in view of the measured MAC move rate.

As used herein, the term "MAC move" may include changes to features other than the port depending on which protocol or protocols are running. In this way, what constitutes a MAC move is feature (i.e., protocol) specific. Examples of changes that can constitute a MAC move include:
1) a source MAC moving from one port to another port as described above with reference to FIG. 3.
2) a source MAC moving from one VLAN to another VLAN (e.g., from VLAN 10 to VLAN 20).
3) a source MAC moving from one asynchronous transfer mode (ATM) VC to another ATM VC (even if a related VLAN ID stays the same).
4) a source MAC moving from one multiprotocol label switched (MPLS) label to another MPLS label.

Figure 8:
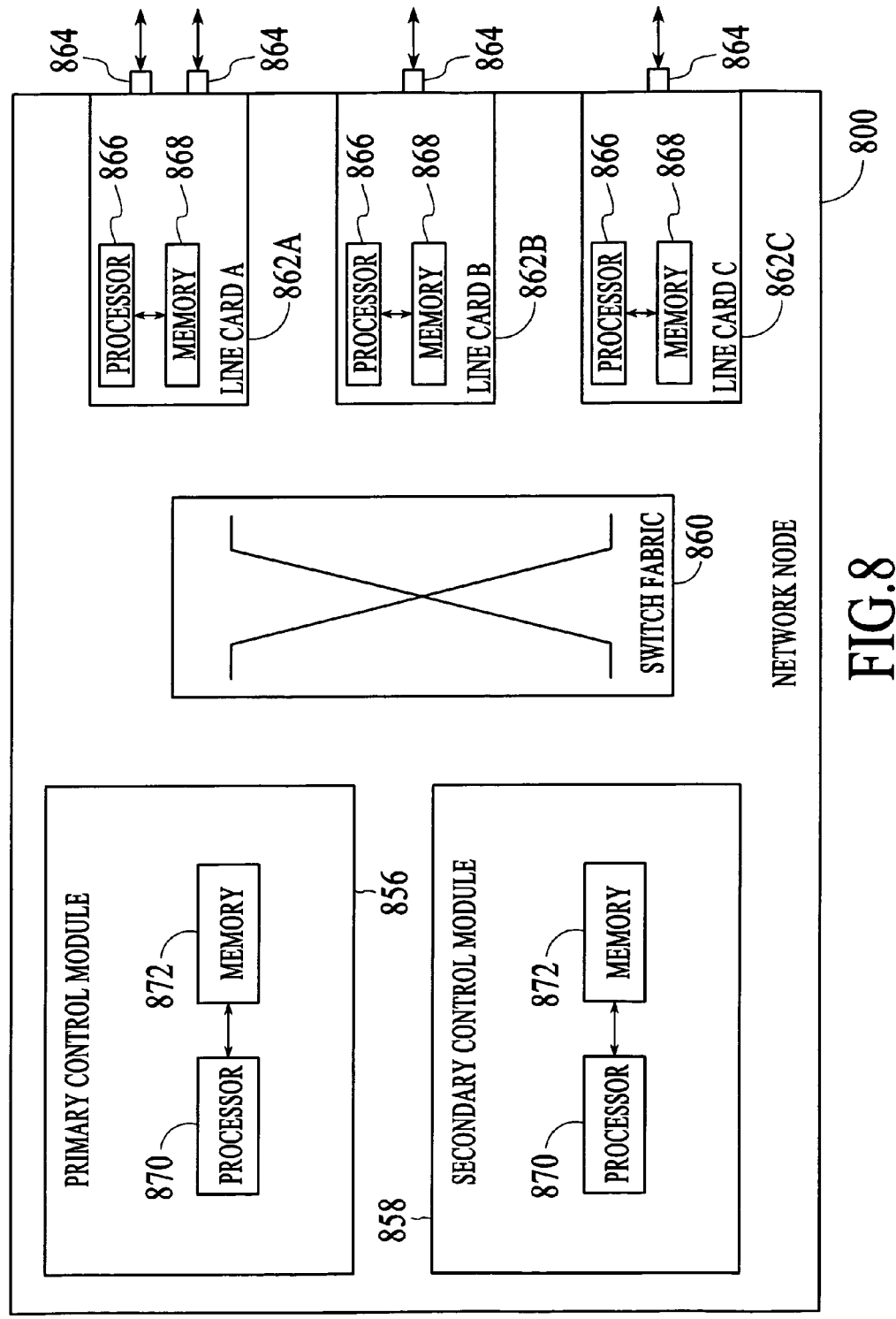
FIG. 8 depicts an embodiment of a network node in which an embodiment of the invention can be implemented.

FIG. 8 depicts an embodiment of a network node 800 in which an embodiment of the invention can be implemented. The example network node, which can be implemented as a carrier edge device, includes a primary control module 856, a secondary control module 858, a switch fabric 860, and three line cards 862A, 862B, and 862C (line cards A, B, and C). The network node handles traffic in discrete units, often referred to as datagrams. In an embodiment, the network node is an Ethernet switch/router that forwards traffic within the network node using Layer 2, Layer 3, and/or Layer 4 header information. The network node may include line cards that support network protocols such as Ethernet, ATM, and Frame Relay. Although an Ethernet-based switch/router is described, the disclosed loop management techniques can be applied to other types of network nodes.

Each of the line cards includes at least one port 864, a processor 866, and memory 868, which perform functions such as receiving traffic into the network node, buffering traffic, making forwarding decisions, and transmitting traffic from the network node. The processor within each line card may include a multifunction processor and/or an application specific processor that is operationally connected to the memory. The processor performs functions such as packet parsing, packet classification, and making forwarding decisions. The memory within each line card may include circuits for storing operational code, for buffering traffic, for storing logical port information, and for storing other data structures. Operational code is typically stored in non-volatile memory such as electrically erasable programmable read-only memory (EEPROM) or flash ROM while traffic and data structures are typically stored in volatile memory such as random access memory (RAM). Example data structures that are stored in the RAM include traffic forwarding information (i.e., exit port tables). Forwarding information may also be stored in content addressable memory (CAM) or a combination of CAM and RAM. Although the processor and memory are depicted as separate functional units, in some instances, the processor and memory are integrated onto the same device. In addition, there may be more than one discrete processor unit and more than one memory unit on the line cards.

The switch fabric 860 provides datapaths between input ports and output ports and may include, for example, shared memory, shared bus, and crosspoint matrices. Although not depicted, the network node 800 may be equipped with redundant switch fabrics.

The primary and secondary control modules 856 and 858 support various functions, such as network management functions and protocol implementation functions. Example network management functions that are performed by the control modules include implementing configuration commands, providing timing control, programming hardware tables, providing system information, supporting a user interface, managing hardware changes, bus management, managing logical ports, managing VLANs, and protocol processing. Example protocols that are implemented by the control modules include Layer 2 (L2) protocols, such as L2 Learning, STP, and LACP and Layer 3 (L3) protocols such as OSPF, BGP, and ISIS. The layers are defined by the ISO in the OSI model.

Each of the control modules 856 and 858 includes a processor 870 and memory 872 for carrying out the designated functions. The processor within each control module may include a multifunction microprocessor and/or an application specific processor that is operationally connected to the memory. The memory may include EEPROM or flash ROM for storing operational code and DRAM for buffering traffic and storing data structures, such as port information and VLAN tables. Although the processor and memory are depicted as separate functional units, in some instances, the processor and memory are integrated onto the same device. In addition, there may be more than one discrete processor unit and more than one memory unit on the control modules.

Figure 9:
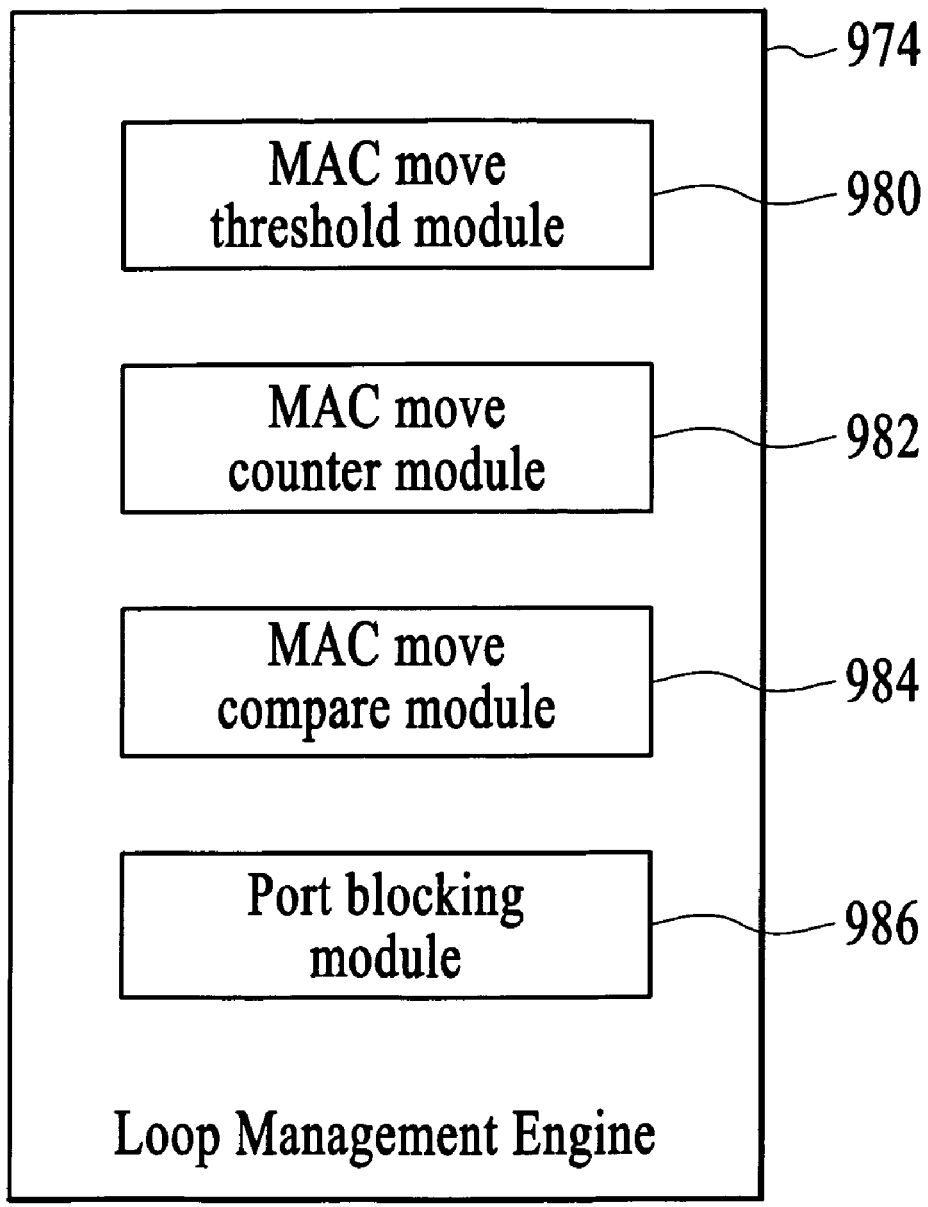
FIG. 9 is a functional depiction of a loop management engine in accordance with the invention.

In an embodiment, the loop management functionality that is described above with reference to FIGS. 1-7 is implemented with the support of loop management engines that exist at the control modules and the line cards. FIG. 9 illustrates a functional depiction of a loop management engine 974 that exists at a control module and line cards of a network node. The loop management engine may be embodied in a combination of software and hardware. Functional elements of the loop management engine include a MAC move threshold module 980, a MAC move counter module 982, a MAC move compare module 984, and a port blocking module 986. These modules perform the corresponding functions that are described above with reference to FIGS. 1-7.

As described above, the movement of MAC addresses between ports of a network node is an indication of a loop. In particular, it is recognized that the movement of a MAC address between a set of ports at which the MAC address was previously found is a strong indication of a loop. In order to detect a loop in a network it is desirable to quickly and reliably identify when a MAC address is moving between a set of ports at which the MAC address was previously found. In accordance with an embodiment of the invention, quick and reliable loop detection is accomplished by artificially accelerating the MAC move count related to a MAC address when the MAC address is moving between a set of ports at which the MAC address was previously found. Accelerating the MAC move count allows the MAC move threshold to be set at a higher level that is less likely to be exceeded by normal activities in the network which result in MAC address movement. The MAC move count is artificially accelerated by weighting the MAC move count once it has been determined that a MAC address is moving between a set of ports at which the MAC address was previously found. In the most basic case, a loop causes MAC movement between just two ports of a network node. However, in more complex network configurations, a loop may cause MAC movement between a larger set of ports. To accommodate this phenomena, the set of ports at which the MAC address was previously found may be set to a maximum number of ports that is greater than two.

Figure 10:
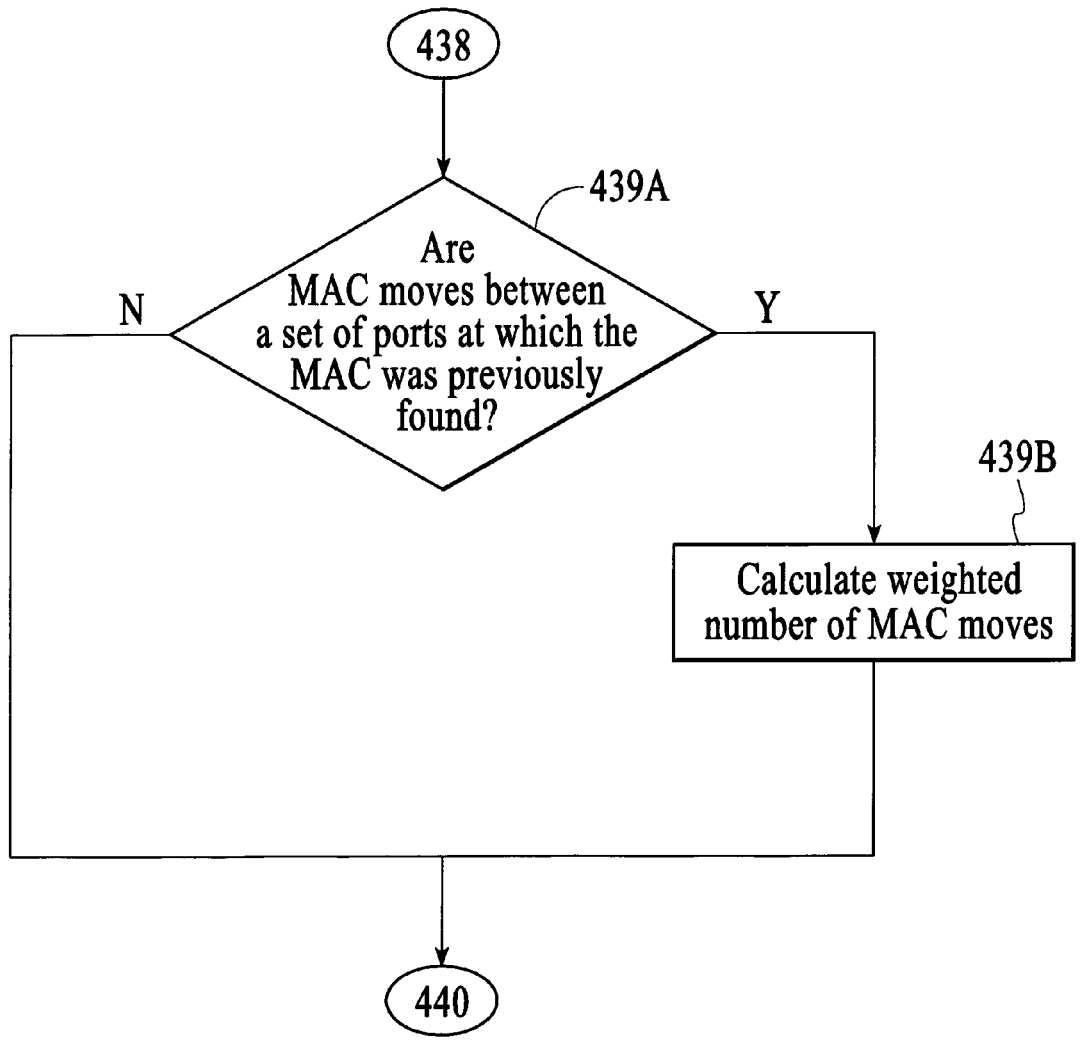
FIG. 10 depicts an enhancement to the process flow diagram of FIG. 4.

The artificial acceleration of the MAC move count can be implemented as an enhancement to the method described above with reference to FIG. 4. In an embodiment, the method of FIG. 4 is enhanced as described below with reference to FIG. 10. In particular, FIG. 10 depicts a process that is implemented between blocks 438 and 440 of the method of FIG. 4. According to the method of FIG. 4, at block 438, the number of MAC moves is monitored. Referring to decision point 439A in FIG. 10, after the number of MAC moves is monitored, it is determined whether or not the MAC moves are between a set of ports at which the MAC address was previously found. If the MAC moves are not between a set of ports at which the MAC address was previously found (e.g., if the source MAC address was moving to a new port each time), then the process goes to decision point 440 (FIG. 4), where the number of MAC moves is compared to the pre-established MAC move threshold. If on the other hand, the MAC moves are between a set of ports at which the MAC was previously found (e.g., the source MAC address is oscillating between a limited set of ports), then the process goes to block 439B. At block 439B, a weighted number of MAC moves is calculated. After the weighted number of MAC moves is calculated, the process goes to decision point 440 (FIG. 4), where the number of MAC moves, in this case the weighted number of MAC moves, is compared to the pre-established MAC move threshold. If the number of MAC moves exceeds the MAC move threshold then it is concluded that a loop exists. Because the number of MAC moves is weighted when the MAC moves are between a set of ports at which the MAC address was previously found, the number of MAC moves will exceed the MAC move threshold quicker than if the number of MAC moves had not been weighted. Additionally, the differential between the weighted number of MAC moves and the un-weighted number of MAC moves makes it easier to identify when a MAC address is moving back and forth between a set of ports at which the MAC address has previously been found. In an embodiment, the MAC move threshold is raised to a level that is expected to be exceeded only by a weighted MAC move count as opposed to the un-weighted MAC move counts.

Figure 11A:
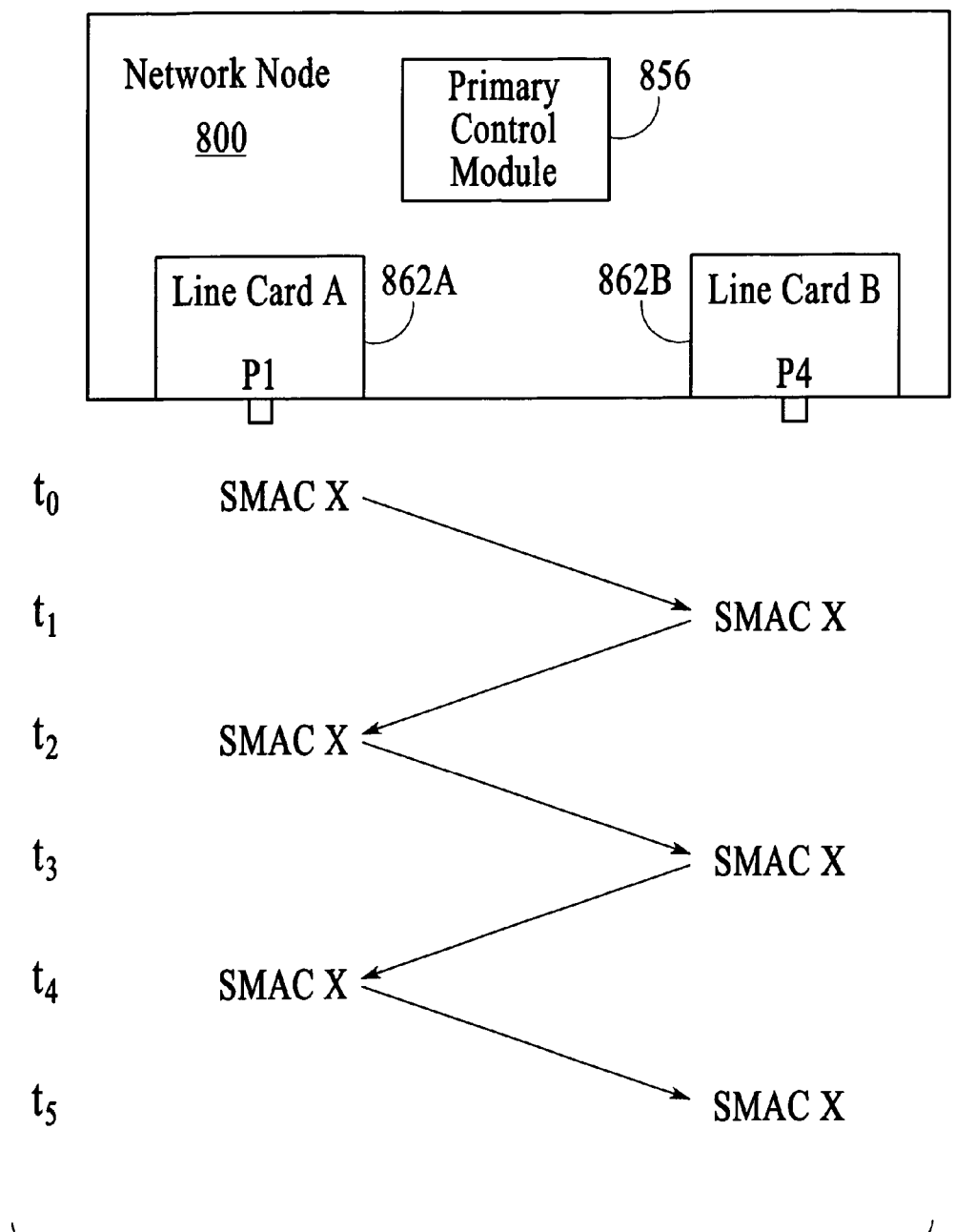
FIG. 11A illustrates the movement of a MAC address between two different ports of a network node.
Figure 11B:
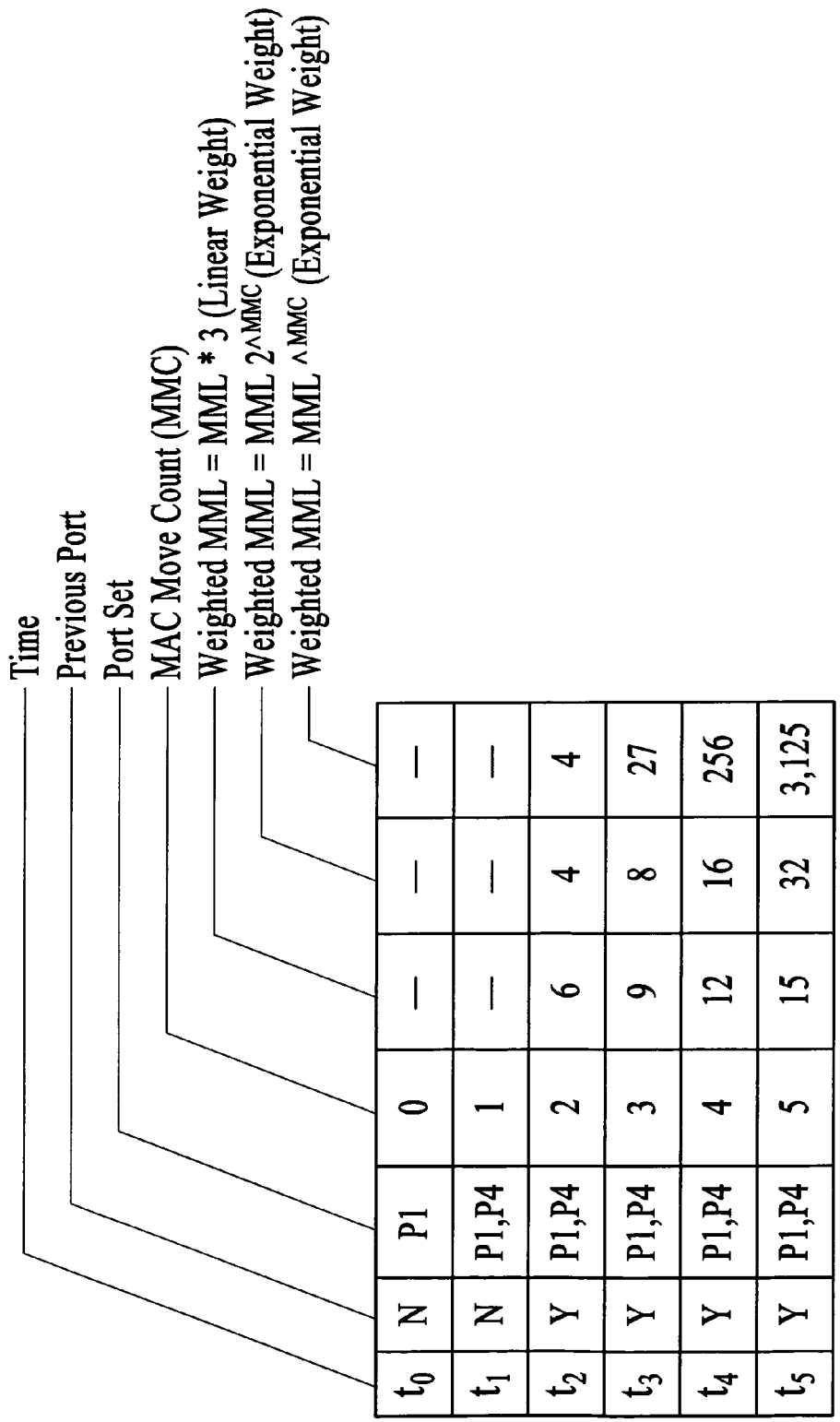
FIG. 11B illustrates how the MAC move count changes depending on whether or not the MAC address is found at a port at which it was previously found and on the weighting scheme that is applied to the MAC moves illustrated in FIG. 11A.
Figure 11C:
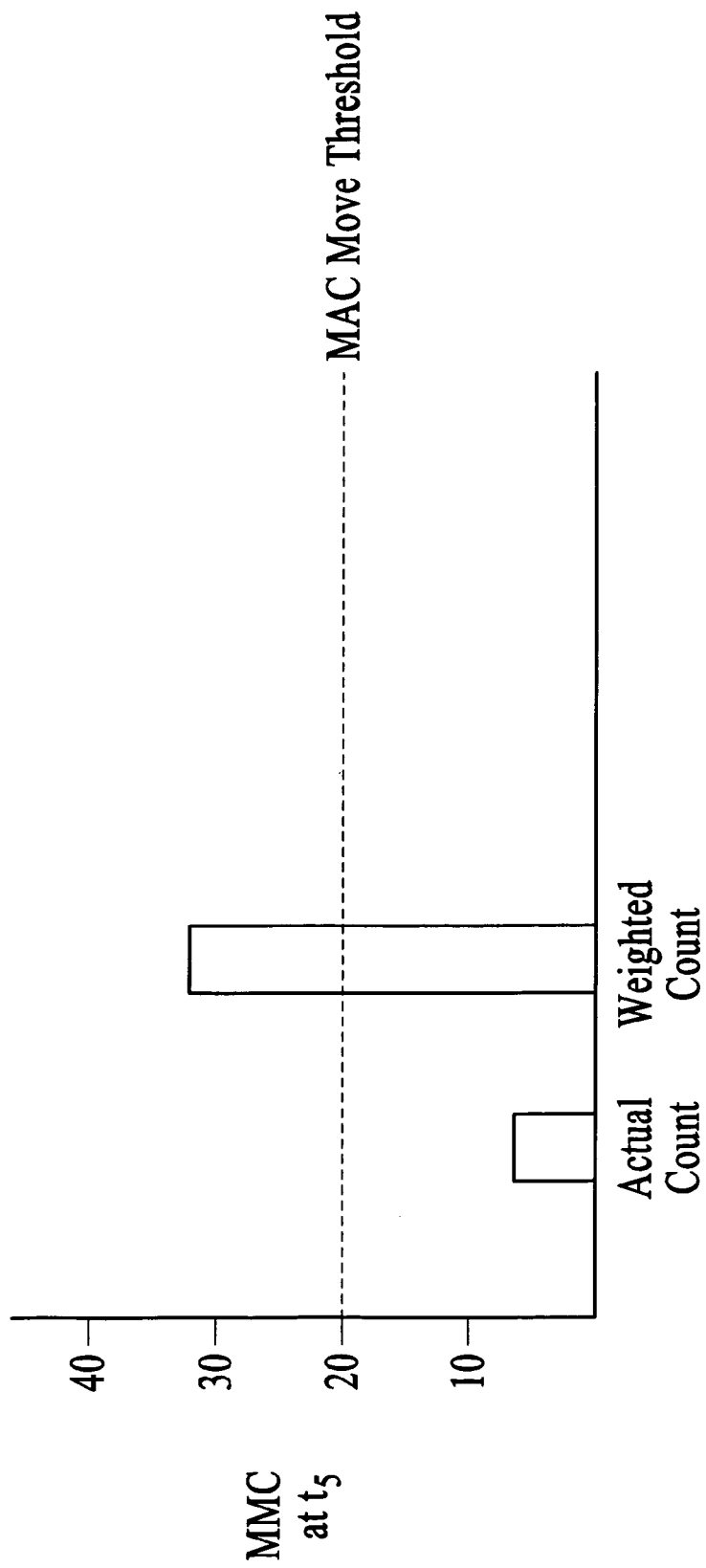
FIG. 11C illustrates the MAC move counts of FIG. 11B relative to a MAC move threshold at time $t_5$ for the actual MAC move count and the weighted MAC move count from column 2.

An example of the process described above with reference to FIGS. 4 and 10 is illustrated in FIGS. 11A through 11C. FIG. 11A illustrates the movement of a MAC address (e.g., source MAC X) between two different ports of a network node. The network node includes a primary control module 856, line card A 862A, and line card B 862B. Port P1 is located on line card A and port P4 is located on line card B. As illustrated in FIG. 11A, at time $t_0$, source MAC X is found at port P1. At time $t_1$, source MAC X is found at port P4, which constitutes a MAC move and initiates MAC processing in the network node. At time $t_2$, source MAC X is found at port P1 again, which constitutes another MAC move and again initiates MAC move processing. This process of MAC moves continues through time $t_5$.

FIG. 11B illustrates how the MAC move count changes depending on whether or not the MAC address is found at a port at which it was previously found and on the weighting scheme that is applied to the MAC moves illustrated in FIG. 11A. The first column identifies times $t_0$-$t_5$, which coincide with the times $t_0$-$t_5$ as illustrated in FIG. 11A. The second column indicates whether or not the port at which the MAC address is currently found is within a set of ports at which the MAC address was previously found and the third column identifies the set of ports at which the source MAC address was previously found. Referring to time $t_0$, source MAC X has only been found at port P1 so the "Previous Port" field is "N" for no. Again at time $t_1$, source MAC X is found at port P4, which is not one of the ports at which the MAC address was previously found. At time $t_2$, source MAC X returns to a port at which it was previously found. From time $t_2$ onward, source MAC X oscillates between ports P1 and P4 and therefore the "Previous Port" field is "Y" for yes.

The fourth column tracks the number of MAC moves that are recognized between ports P1 and P4. This number of MAC moves is incremented by one upon each MAC move and is referred to as the actual MAC move count.

In FIG. 11B, three different weighting schemes are applied to the MAC moves for exemplary purposes. The three MAC move weighting schemes are:

1) column five, a linear weighting scheme with a linear weight of 3, wherein, weighted MAC move count (MMC)=MMC*3;
2) column six, an exponential weighting scheme, wherein, weighted MMC=2^MMC;
3) column seven, an exponential weighting scheme, wherein, weighted MMC=MMC^MMC.

Although a few examples of weighting schemes are provided, other weighting schemes are possible. Further, although the above-described weighting schemes are static weighting schemes, the weighting scheme can be dynamic. For example, the weighting scheme can be configured to increase the weight as the MAC move count increases. Other weighting schemes, which are a function of the MAC move count are also possible. In an embodiment, the weighting scheme is selected as a function of the source MAC address. For example, different weighting schemes are used for different source MAC addresses. This allows for the efficient identification of particular source MAC addresses, for example, certain control MAC addresses that should not be received on a particular port.

Looking at FIG. 11B on a row-by-row basis, at times $t_0$ and $t_1$, the MAC move count is not weighted because the MAC is not found at a port at which the MAC was previously found. At time $t_2$, a weighted MAC move count is calculated because the MAC is found at a port at which the MAC was previously found. With the actual MAC move count at 2, the weighted MAC move counts are calculated as 6, 4, and 4, respectively, using the three weighting schemes. It should be noted that although three different weighting schemes are depicted in parallel in FIG. 11B, it is most likely that only one weighting scheme will be implemented at any one time. At time $t_3$, the actual MAC move count is 3 and the weighted MAC move counts are calculated as 9, 8, and 27, respectively. At time $t_4$, the actual MAC move count is 4 and the weighted MAC move counts are calculated as 12, 16, and 256, respectively. At time $t_5$, the actual MAC move count is 5 and the weighted MAC move counts are calculated as 15, 32, and 3,125, respectively. As illustrated in FIG. 11B, in each case the weighted MAC move count is larger than the actual or "non-weighted" MAC move count. Further, as the number of MAC moves increases, the difference between the actual MAC move count and the weighted MAC move count increases. The difference between the actual MAC move count and the weighted MAC move count increases at different rates depending on the weighting scheme that is applied. For example, applying the weighting scheme in column 3, after just five MAC moves, the weighted MAC move count is already 625 times the actual MAC move count.

FIG. 11C illustrates the MAC move counts for the actual MAC move count and the weighted MAC move count from column six of FIG. 11B (i.e., weighted MMC=2^MMC) relative to a MAC move threshold at time $t_5$. In this case, the MAC move threshold is set at 20 MAC moves and as illustrated, the weighted MAC move count of 32 at time $t_5$ exceeds the MAC move threshold. In contrast, the actual MAC move count of 5 at time $t_5$ will not exceed the MAC move threshold until after another fifteen MAC moves have occurred.

In one implementation of the loop detection technique, a network node (e.g., a service provider edge device) maintains a MAC move table to track MAC moves. FIG. 12 depicts an exemplary MAC move table that includes fields for tracking MAC moves as described above. The fields of the MAC move table and description of the corresponding fields are as follows:

1) MAC address—the source MAC address;
2) Broadcast Domain ID—the broadcast domain on which MAC moves are tracked for the identified source MAC address. The broadcast domain may include any identifiable broadcast domain, including, but not limited to, a customer VLAN, a provider VLAN, provider backbone VLAN, provider service instance, or a VPLS domain;
3) MAC move count—the number of times the MAC address has moved within a pre-established time interval;
4) Port Set—a record of the ports at which the source MAC address was previously found within a pre-established time interval; and
5) Size of the Port Set—the maximum number of ports in the port set.

Although one example of a MAC move table is described, other embodiments of a MAC move table are possible.

When using the MAC move table described above with reference to FIG. 12, the MAC address and broadcast domain are stored for each MAC address that is to be tracked. When a MAC move is identified for the MAC address, the port to which the MAC address has moved is added to the port set as long as the number of ports in the port set is not exceeded. Additionally, a check is made to determine if the port at which the MAC address is presently found matches one of the ports in the port set. A match between the present port and a port in the port set indicates that the MAC address has returned to a port at which the MAC address was previously found. As described above with reference to FIG. 10, if the port at which the MAC address is previously found does not match a port in the port set, then the MAC move count is increased as normal (e.g., incremented by one count). On the other hand, if the port at which the MAC address is presently found does match a port in the port set, then a weighted MAC move count is calculated using the weighting scheme. In an embodiment, a new entry is created in the MAC move table each time a MAC move is detected and the MAC address does not already exist in the MAC move table. The number of MAC addresses that are included in the MAC move table is implementation specific.

Figure 13:
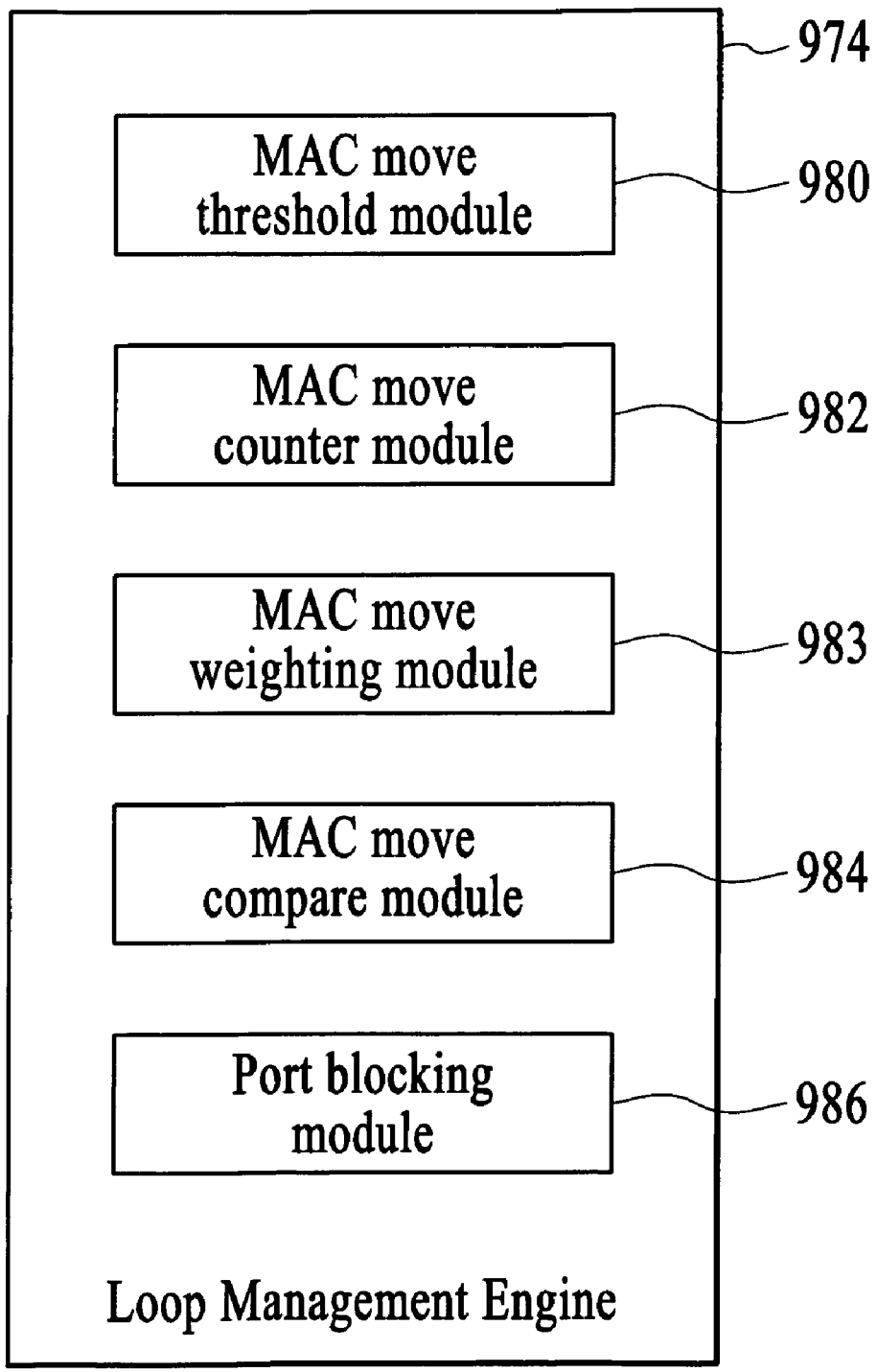
FIG. 13 depicts a loop management engine that includes the elements of the loop management engine of FIG. 9 as well as a MAC move weighting module.

In an embodiment, the weighting of the MAC move count is accomplished by a MAC move weighting module in a network node. FIG. 13 depicts a loop management engine that includes the elements of the loop management engine of FIG. 9 as well as a MAC move weighting module. Functional elements of the loop management engine include a MAC move threshold module 980, a MAC move counter module 982, a MAC move weighting module, 983, a MAC move compare module 984, and a port blocking module 986. These modules perform the corresponding functions that are described above with reference to FIGS. 1-7 and FIGS. 10-12. In particular, the MAC move weighting module performs the functions of determining whether or not a MAC is moving between a set of ports at which the MAC was previously found and calculating the weighted MAC move count.

As used herein, the MAC move count may represent a number of MAC moves, a number of MAC moves in a known time interval, or a MAC move rate.

Figure 14:
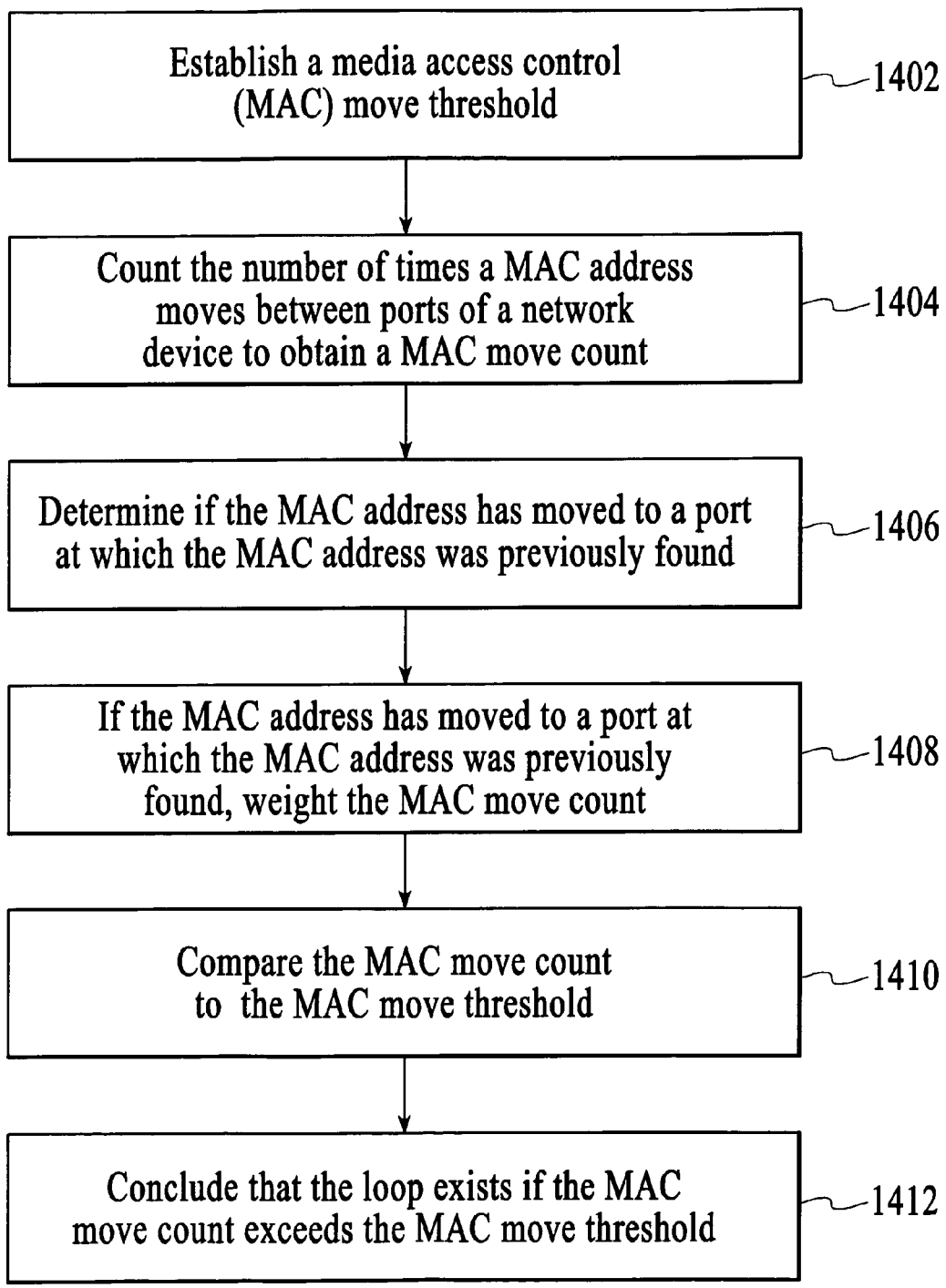
FIG. 14 is a process flow diagram of a method for detecting a loop between network devices.

FIG. 14 is a process flow diagram of a method for detecting a loop between network devices. At block 1402, a MAC move threshold is established. At block 1404, the number of times a MAC address moves between ports of a network device is counted to obtain a MAC move count. At block 1406, it is determined if the MAC address has moved to a port at which the MAC address was previously found. At block 1408, if the MAC address has moved to a port at which the MAC address was previously found, then the MAC move count is weighted. At block 1410, the MAC move count is compared to the MAC move threshold. At block 1412, it is concluded that a loop exists if the MAC move count exceeds the MAC move threshold.

Although specific embodiments of the invention have been described and illustrated, the invention is not to be limited to the specific forms or arrangements of parts as described and illustrated herein. The invention is limited only by the claims.

What is claimed is:

1. A method for detecting a loop between network devices comprising:
    establishing a media access control (MAC) move threshold;
    counting the number of times a MAC address moves between ports of a network device to obtain a MAC move count;
    determining if the MAC address has moved to a port at which the MAC address was previously found;
    if the MAC address has moved to a port at which the MAC address was previously found, weighting the MAC move count;
    comparing the MAC move count to the MAC move threshold; and
    concluding that a loop exists if the MAC move count exceeds the MAC move threshold.

2. The method of claim 1 wherein determining if the MAC address has moved to a port at which the MAC address was previously found comprises maintaining a record of a set of ports at which the MAC address was previously found.

3. The method of claim 2 further comprising limiting the set of ports to a maximum number.

4. The method of claim 1 wherein loops are detected on a per-broadcast domain basis.

5. The method of claim 1 wherein weighting the MAC move count comprises exponentially weighting the MAC move count.

6. The method of claim 1 wherein weighting the MAC move count comprises linearly weighting the MAC move count.

7. The method of claim 1 wherein the MAC move count is weighted as a function of the MAC move count.

8. The method of claim 1 wherein weighting the MAC move count comprises weighting the MAC move count as a function the MAC address, wherein the MAC address is a source MAC address.

9. The method of claim 1 wherein establishing the MAC move threshold includes identifying a number of MAC moves per unit of time.

10. The method of claim 1 further comprising initiating a loop protection action if it is concluded that a loop exists.

11. A method for detecting loops between a customer network and a carrier network comprising:
    establishing a media access control (MAC) move threshold;
    monitoring moves of a MAC address between ports of a carrier device that are caused by customer traffic from a customer network to determine a MAC move count, the carrier device being in a carrier network that receives traffic from the customer network;
    determining if the MAC address has moved to a port at which the MAC address was previously found;
    if the MAC address has moved to a port at which the MAC address was previously found, weighting the MAC move count;
    at the carrier device, comparing the MAC move count to the MAC move threshold; and
    concluding that a loop exists if the MAC move count exceeds the MAC move threshold.

12. The method of claim 11 wherein determining if the MAC address has moved to a port at which the MAC address was previously found comprises maintaining a record of a set of ports at which the MAC address was previously found.

13. The method of claim 12 further comprising limiting the set of ports to a maximum number.

14. The method of claim 11 wherein loops are detected on a per-broadcast domain basis.

15. The method of claim 11 wherein the MAC move count is weighted as a function of the MAC move count.

16. The method of claim 11 wherein weighting the MAC move count comprises weighting the MAC move count as a function of the MAC address, wherein the MAC address is source MAC address.

17. The method of claim 11 further comprising initiating a loop protection action at the carrier device if the rate of MAC moves exceeds the MAC move threshold.

18. A system for detecting loops between a customer network and a carrier network comprising:
a loop management engine configured to:
establish a media access control (MAC) move threshold;
count the number of times a MAC address moves between ports of a network device to obtain a MAC move count;
determine if the MAC address has moved to a port at which the MAC address was previously found;
if the MAC address has moved to a port at which the MAC address was previously found, weight the MAC move count;
compare the MAC move count to the MAC move threshold; and
conclude that a loop exists if the MAC move count exceeds the MAC move threshold.

19. The system of claim 18 wherein the loop management engine is configured to maintain a record of a set of ports at which the MAC address was previously found.

20. The system of claim 18 wherein the set of ports is limited to a maximum number.

* * * * *